Figure 2:
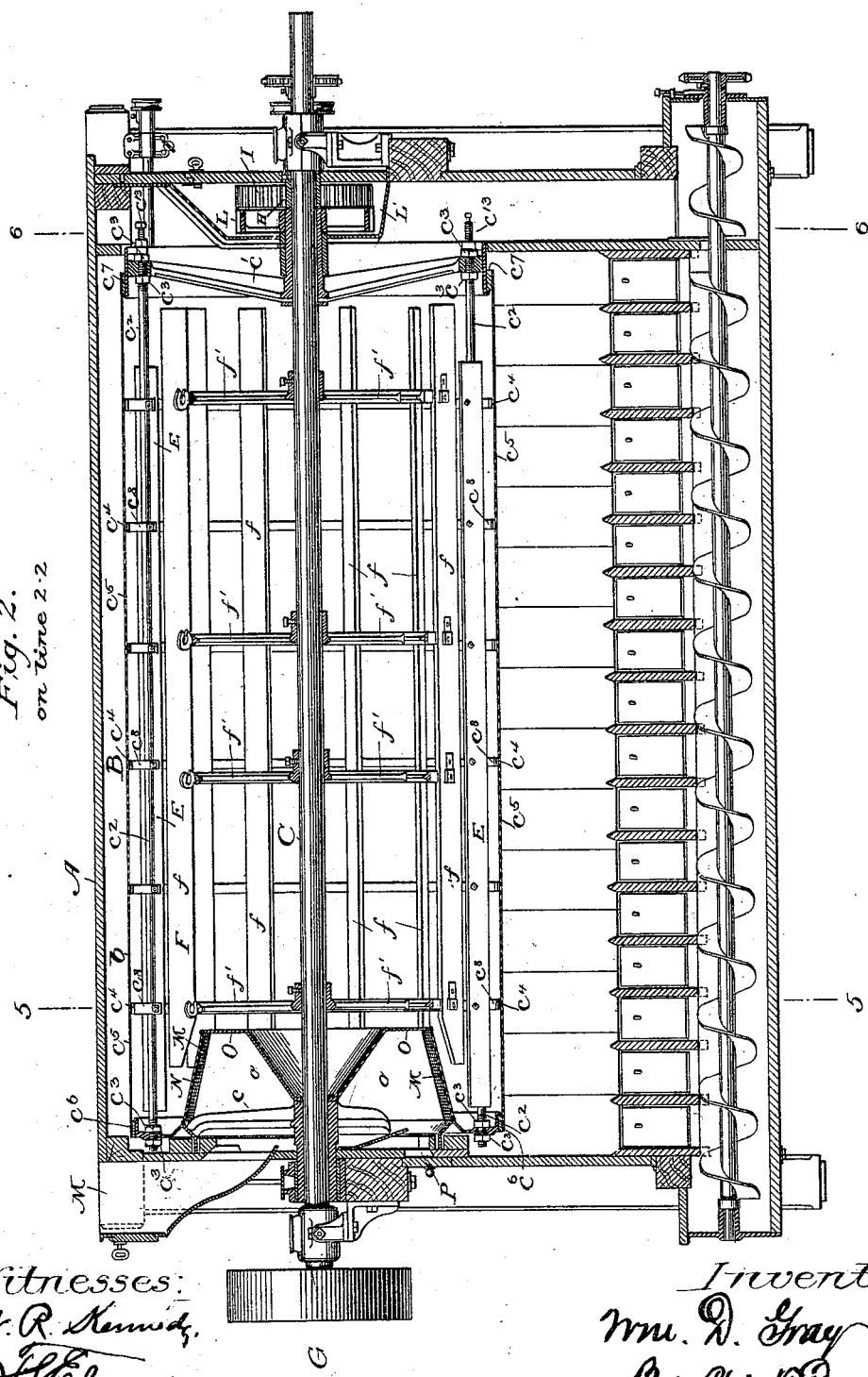

(No Model.)

6 Sheets—Sheet 1.

W. D. GRAY.
FLOUR BOLT.

No. 514,317.

Patented Feb. 6, 1894.

Fig. I.

Witnesses:
N. R. Kennedy
T. S. Clinton

Inventor:
Wm. D. Gray
By Phil. T. Dodge atty (No Model.)  6 Sheets—Sheet 2.

W. D. GRAY.
FLOUR BOLT.

No. 514,317.  Patented Feb. 6, 1894.

on line 2-2.

Witnesses:
W. R. Kennedy
J. F. Elmore

Inventor:
Wm. D. Gray
By Phil. T. Dodge Atty (No Model.) W. D. GRAY. 6 Sheets—Sheet 3.
FLOUR BOLT.

No. 514,317. Patented Feb. 6, 1894.

Witnesses: Inventor:
W. R. Kennedy Wm. D. Gray
J. J. Elmer By Phil T. Dodge
Atty (No Model.) 6 Sheets—Sheet 4.
W. D. GRAY.
FLOUR BOLT.
No. 514,317. Patented Feb. 6, 1894.
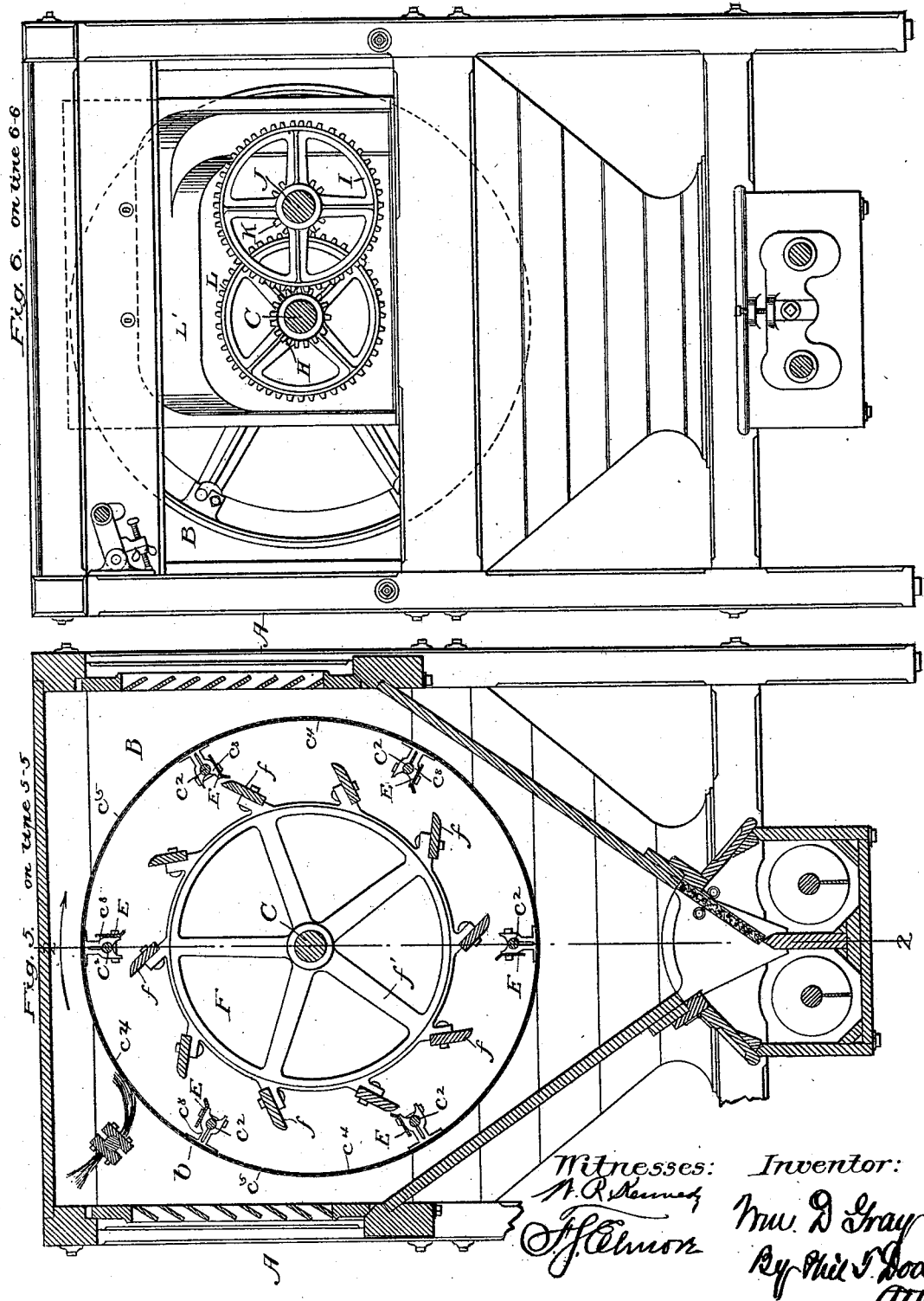

(No Model.) 6 Sheets—Sheet 5.
W. D. GRAY.
FLOUR BOLT.
No. 514,317. Patented Feb. 6, 1894.
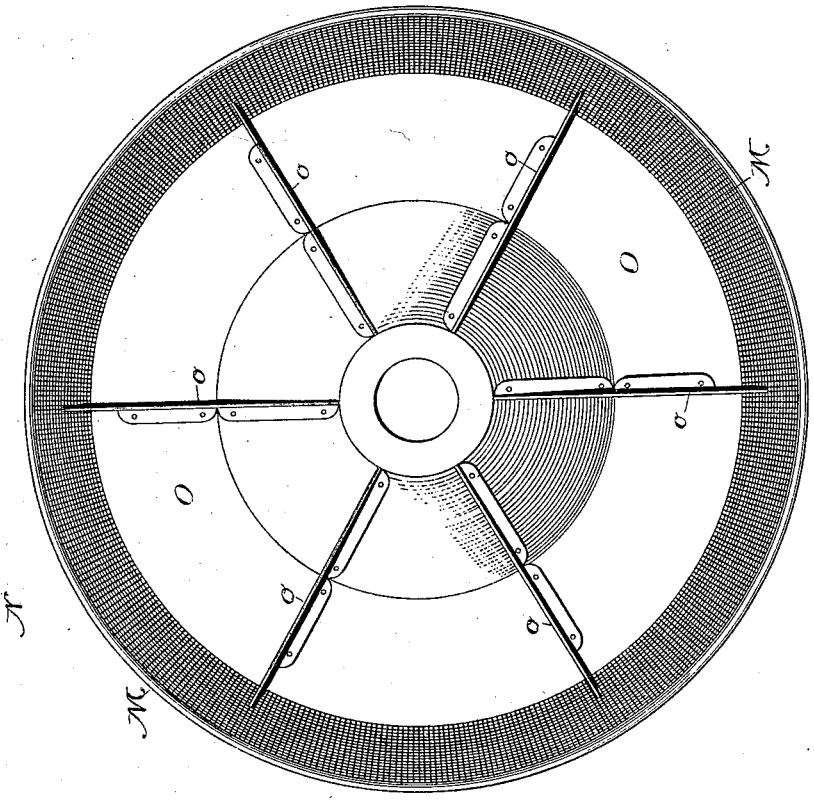
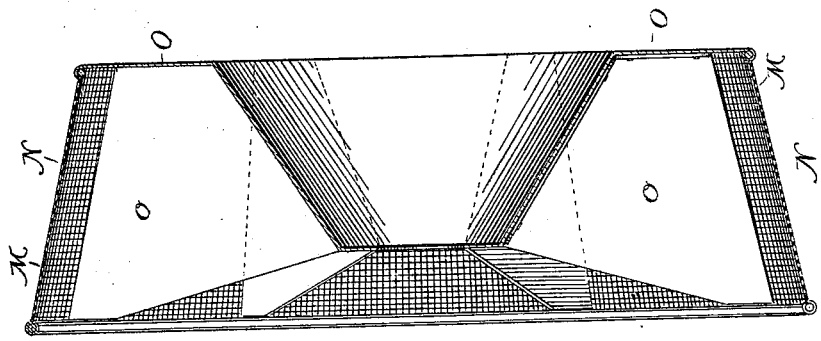
Witnesses:
W. R. Kennedy
T. F. Elmore
Inventor:
Wm. D. Gray
By Phil T. Dodge
Atty
THE NATIONAL LITHOGRAPHING COMPANY,
WASHINGTON, D. C.

(No Model.) 6 Sheets—Sheet 6.

W. D. GRAY.
FLOUR BOLT.

No. 514,317. Patented Feb. 6, 1894.

Witnesses:
W. R. Kennedy
F. S. Elmore

Inventor:
Wm. D. Gray
By Phil T. Dodge
Atty

UNITED STATES PATENT OFFICE.

WILLIAM D. GRAY, OF MILWAUKEE, WISCONSIN, ASSIGNOR TO THE EDWARD P. ALLIS COMPANY, OF WISCONSIN.

FLOUR-BOLT.

SPECIFICATION forming part of Letters Patent No. 514,317, dated February 6, 1894.

Application filed November 23, 1891. Serial No. 412,828. (No model.)

*To all whom it may concern:*

Be it known that I, WILLIAM D. GRAY, of Milwaukee, county of Milwaukee, and State of Wisconsin, have invented a new and useful Improvement in Flour-Bolts, of which the following is a specification.

This invention relates to machines intended more particularly for separating fine flour from the coarser grain products, and the objects of the invention are mainly to secure a thorough and efficient separation of the flour with the least possible agitation, and breakage of the bran and other coarse matters, and to increase the capacity of the machine in proportion to its size by bringing into constant action substantially the entire surface of the bolting cloth.

To this end I combine with a cylindrical reel arranged in a horizontal or slightly inclined position, and having a continuous surface of bolting cloth, a series of lifting blades or buckets which serve to carry the material upward on the upgoing side of the reel, and permit it to flow backward over the bolting cloth; and a series of independently and rapidly revolving blades whereby a portion of the material lifted by the buckets is caught and thrown upward against the upper surface of the bolting cloth, and against the cloth on the down going side, so that by the conjoint action of the lifting buckets, and the revolving blades, I am enabled to deliver the material to be separated over substantially the entire inner surface of the reel, thus bringing into action the whole, or substantially the whole, surface of the bolting cloth.

I believe myself to be the first to combine with a bolting reel, means for lifting and spreading the material over the upgoing side, and means for directing a portion of the material against the overlying cloth at the top, and against the cloth on the downgoing side, and it will be manifest to the skilled mechanic, after consideration of this specification, that the form and arrangement of the parts may be variously modified without essentially changing the mode of action, or passing beyond the limits of my invention.

In the accompanying drawings I have represented a construction which I find well adapted for practical use.

Figure 4:
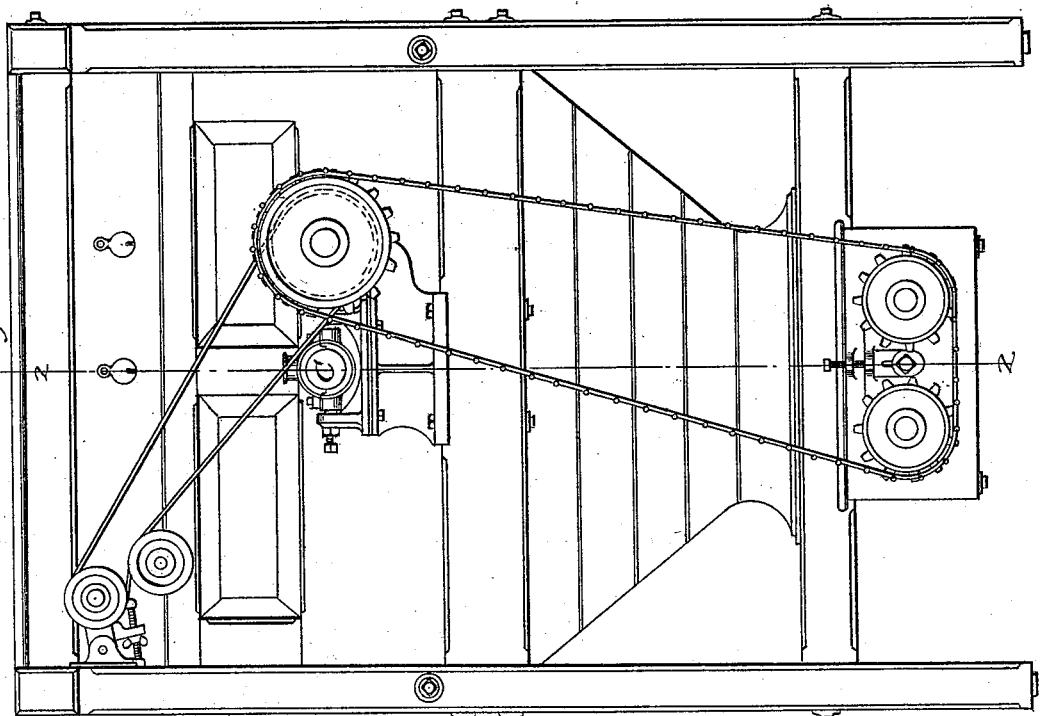
Figure 3:
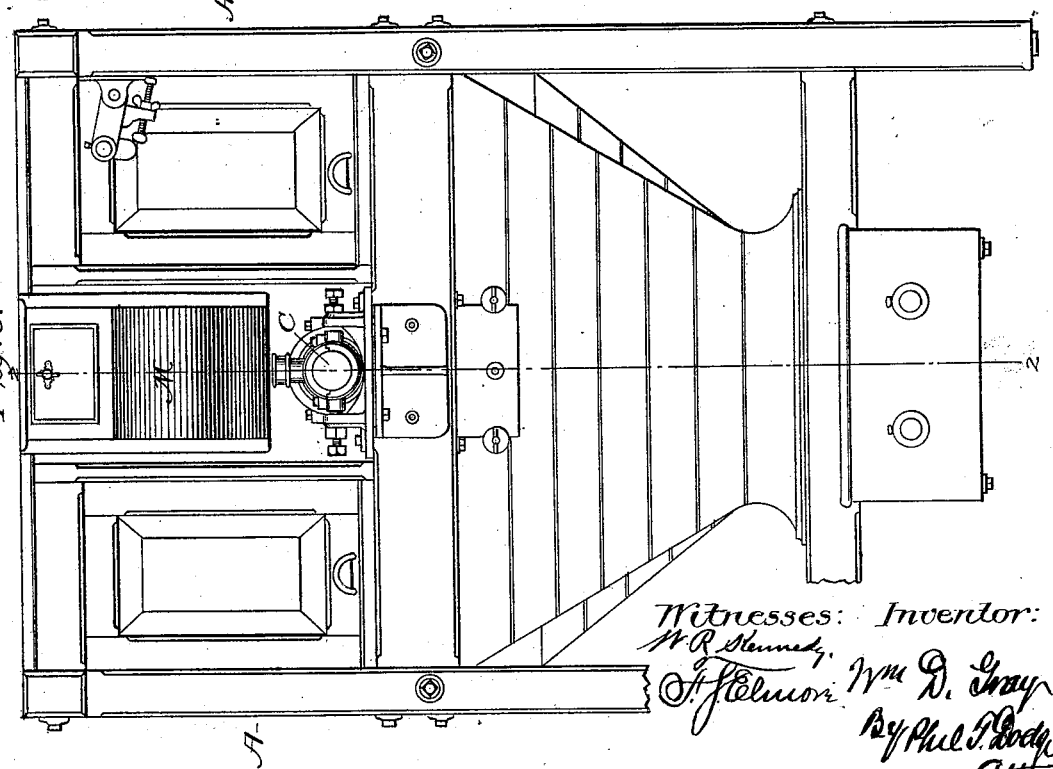
Figure 9:
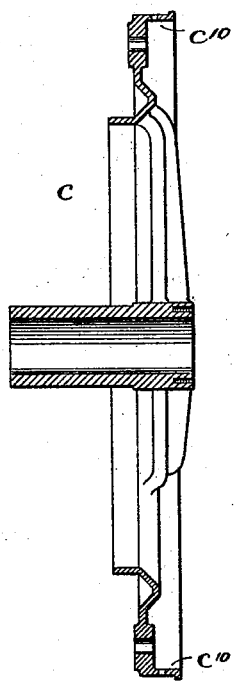
Figure 10:
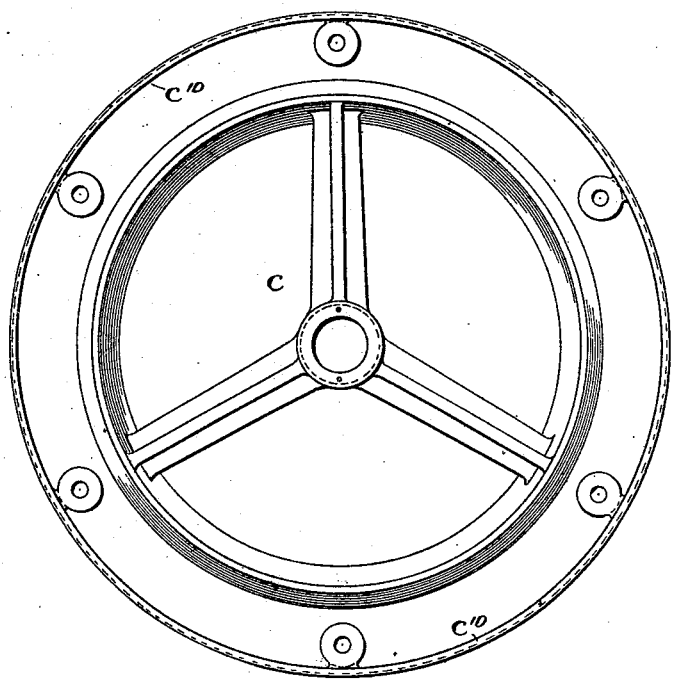
Figure 11:
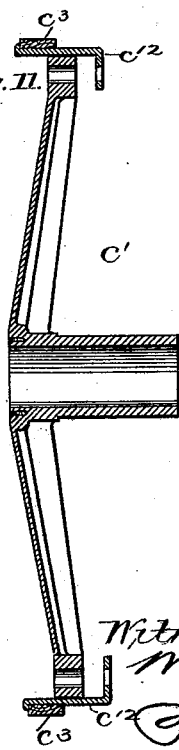
Figure 12:
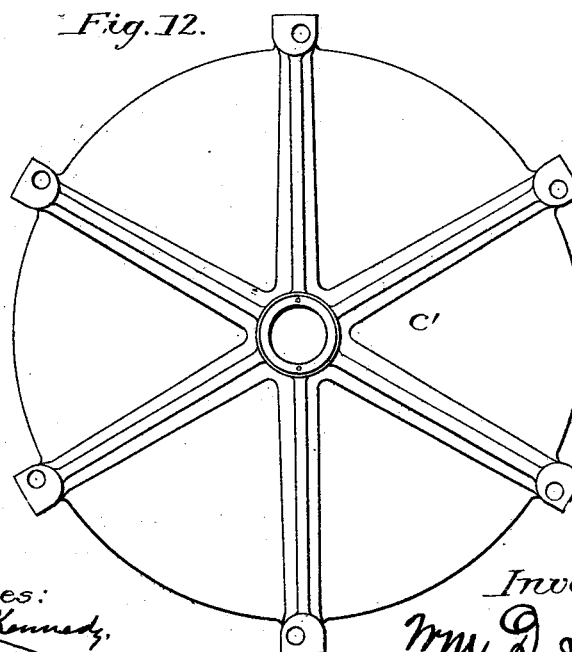

In the drawings,—Figure 1 is a side elevation of my machine; Fig. 2 a longitudinal vertical section through the center of the machine on line 2—2 of Figs. 3, 4 and 5. Figs. 3 and 4, are respectively elevations of the head and tail ends of the machine. Fig. 5 is a vertical cross-section on the line 5—5 of Figs. 1 and 2. Fig. 6 is a vertical cross-section on the line 6—6 of Figs. 1 and 2. Figs. 7 and 8 are respectively an axial section, and an end view of the parallel screen in the head of the reel. Figs. 9 and 10, are respectively a cross-section, and an end view of the head spider. Figs. 11 and 12 are similar views of the tail spider.

Referring to the drawings,—A, represents a rigid main-frame or casing which may be of any construction adapted to sustain and inclose the operative parts hereinafter described.

B, is the cylindrical reel sustained preferably in a slightly inclined position by the longitudinal shaft C, the ends of which are mounted in fixed bearings in the main-frame as usual. The reel is made of cylindrical form, and clothed throughout its length with bolting cloth or other appropriate pervious material $b$, the construction being such that the bolting cloth presents on the interior a smooth uninterrupted cylindrical surface. The frame of the reel may be constructed in any manner adapted to sustain the cloth as described, but in the preferred construction represented in the drawings $c$, $c'$, represent two skeleton circular spiders mounted to turn loosely on opposite ends of the shaft, and connected by longitudinal bolts $c^2$, which are passed therethrough and secured firmly thereto by nuts $c^3$. The rods $c^2$ sustain at suitable intervals, blocks or brackets $c^3$, which support in turn the surrounding hoops $c^4$, by which the bolting cloth is given internal support. The bolting cloth $c^5$ is nailed or otherwise fixed at its ends to wooden hoops $c^6$, and $c^7$, carried by the spiders; the former at the head and the latter at the tail. The blocks $c^8$ serve also the additional purpose of sustaining the longitudinal blades or buckets E, bolted thereto for the purpose of elevating the material under treatment on the upgoing side of the reel. These buckets are preferably made of sheet metal of a sectional form shown in Fig. 5, but they may be made of wood or other suitable material, and varied in sectional form at will provided only they are adapted to lift the material on the upgoing side of the reel, and to deliver the same in part to the spreading blades hereinafter described. I adjust the blades in such manner as to leave a space of one inch, more or less, between their outer edges, and the inner surface of the bolting cloth throughout their entire length, so that the mass of material which is carried upward by the blades may flow backward past their outer edges, and thence downward over the ascending surface of the cloth. The inner edges of the blades are preferably bent upward as shown in order to give them greater carrying capacity, so that they may take a portion of the material above the center of the reel, and there deliver it to the spreading blades.

F represents a rotary spreader consisting of a series of longitudinal blades or bars $f$, fixed to the periphery of sustaining spiders $f'$ which are secured or otherwise fixed firmly to the central shaft so as to be rotated thereby. These blades are preferably extended throughout the length of the reel, or substantially so, and are arranged so that in cross-section their outer faces stand in approximately tangential relations to the supporting spiders.

By means of gearing hereinafter described in detail the spreader F, is revolved at a much higher rate of speed than the reel proper, so that the material carried above the center by the upgoing buckets of the reel and poured over their inner edges toward the center, is received or acted upon by the blades $f$, and thrown outward thereby against the inner surface of the bolting cloth at the top, and on the outgoing side.

In practice I find that in a reel of thirty two inches diameter good results are obtained by giving the reel a speed of from nineteen to twenty revolutions per minute, and the beater a speed of two hundred revolutions, the beater being provided with ten blades.

When the parts are proportioned and driven as above described I find that it is possible to obtain a constant delivery of the material against substantially the entire inner surface of the bolting cloth, and this with a smooth and easy action, and without that violent agitation of the material which occurs in what are commonly known as centrifugal separators.

The differential motions may be imparted to the reel and the spreader by mechanism of any suitable character such as will suggest itself to the skilled mechanic, but I recommend as a simple and practical arrangement, that represented in Figs. 2, 4, and 6, in which G, represents the main driving pulley fixed on one end of the shaft C, and imparting motion directly thereto, and to the spreader carried thereby. At the opposite end the shaft C, has fixed upon it a pinion H, engaging a gear wheel I, turning on a stud shaft J. This gear I carries on its side a pinion K, which in turn engages a large gear L, fixed to the tail spider of the reel, whereby the reel is caused to revolve on the shaft C at a much slower speed than the spreader. The train of gearing is mounted within the chest, and is covered or inclosed by a casing L, provided with a suitable gland or stuffing box around the hub of the spider to prevent the flour and dust from gaining access to the gearing.

For the purpose of feeding the material for treatment into the machine I provide the main frame at the head with a stationary hopper or feed spout M, the lower end of which delivers through the spider into the head end of the reel.

For the purpose of preventing the entrance of dough balls or other coarse impurities, I fix within the head of the reel so as to revolve therewith a conical screen N, through which the fine material passes in its course from the hopper to the bolting surface, as in machines heretofore constructed by me. As now constructed this screen contains as a feature of novelty the inner closed end O, constructed of sheet metal, its outer annular portion fitting the inner end of the screen M, while its central portion extends in the form of a conical hub toward the head of the machine for the purpose of limiting the volume of air passing into the head of the reel. A series of blades $o$, are extended from the hub portion outward to the cloth or screening surface, as shown in detail in Figs. 7 and 8. These blades assist in effecting the uniform distribution and delivery of the ingoing material. The coarse matters accumulating in the conical screen N, may be discharged through an opening P, closed by a movable door or slide.

The spider $c$ forming the head of the reel is preferably constructed as shown in detail in Figs. 9 and 10, with its outer annular portion closed to prevent the admission of air and with an annular flange $c^{10}$, projected into a circular groove in the head of the frame to produce a tight joint. This spider $c$ serves also to sustain and carry the conical screen N, which may be fastened thereto in any suitable manner.

The tail spider $c'$ is constructed as shown in detail in Figs. 11 and 12, with a series of arms, the outer ends of which are turned off and adapted to receive and support an encircling hoop or band $c^{12}$, which is movable in the direction of the length of the reel, and which gives support to the hoop $c^8$ carrying the tail end of the bolting cloth.

Bolts $c^{13}$, provided with lock nuts, are tapped through ears on the hoop $c^{12}$, and seated against the arms of the spider $c'$, so that when they are turned in the proper direction, they will force the hoop $c^{12}$ tailward, and thus stretch the bolting cloth longitudinally. The external hoop thus mounted for adjustment on the spider constitutes a very simple and efficient device for establishing and maintaining the requisite tension of the cloth.

I propose to provide the machine as shown at the base with gathering boards, conveyers, and return boards by which to effect a proper gradation and delivery of the bolted material. These parts, as shown in the drawings, form no part of the invention claimed herein, and bear no special relation thereto, and need not therefore be described herein.

While I have described and illustrated a reel of true cylindrical form, it is to be understood that reels of slightly tapered or conical form to facilitate the delivery of the material endwise without inclining the axis will fall within the scope of my invention, conical and cylindrical reels being well known equivalents in the present state of the art.

The reel may be provided with a uniform bolting cloth from end to end, or with cloth graded in fineness from one end to the other as commonly practiced in the art according to the character of the material to be treated, and the extent to which it is to be separated or graded.

While the best results are obtained by rotating the spreader blades in the same direction as the reel, but at a higher speed, it will be manifest that the blades, suitably inclined, may be revolved in the opposite direction to throw the material elevated by the lifting blades or buckets against the cloth at the top and on the downgoing side.

Having thus described my invention, what I claim is—

1. In a bolting reel the combination of the following members: a cylindrical reel provided with internal longitudinal fixed lifting blades separated at their outer edges from the bolting cloth that the material may flow down in part on the ascending side of the cloth, an internal spreader having longitudinal tangentially disposed blades, and mechanism for revolving the reel and the spreader in the same direction at different speeds; whereby the material is lifted and flowed downward continuously on the upgoing side of the reel, and also thrown upward and outward in the top and downgoing side.

2. The cylindrical reel in combination with the lifting blades fixed therein with their inner edges upturned and their outer edges separated from the cloth, the internal spreader with blades tipped backward in the direction of rotation, and mechanism for turning the reel and spreader in one direction at different speeds.

3. In a bolting reel, and in combination with the two spiders and connecting rods, the bolting cloth, the sliding hoop passed from the outside over one of the spiders, and the screws tapped through the hoop and seated against the spider, whereby they are enabled to back the hoop and strain the cloth.

4. In a reel the two spiders, rods connecting them, the bolting cloth, the cloth sustaining hoop encircling one of the spiders and having ears to embrace the rods, and the screws mounted in the hoop and seated against the spider.

5. In a flour bolt the external casing and feed hopper in combination with the reel, the conical screen fixed in its head, and the plate O closing the inner end of the screen and extending outward in the form of a central cone.

6. In combination with the reel and feed hopper, the rotary screen in the head of the reel and the blades fixed within the screen to rotate therewith.

In testimony whereof I hereunto set my hand, this 7th day of November, 1891, in the presence of two attesting witnesses.

WILLIAM D. GRAY.

Witnesses:
WM. BANNEN,
FRANK W. GREENLEAF.